R. TATTU.
TUBE BENDING MACHINE.
APPLICATION FILED JAN. 17, 1910.
986,654.
Patented Mar. 14, 1911.
2 SHEETS—SHEET 1.
Fig. 1.
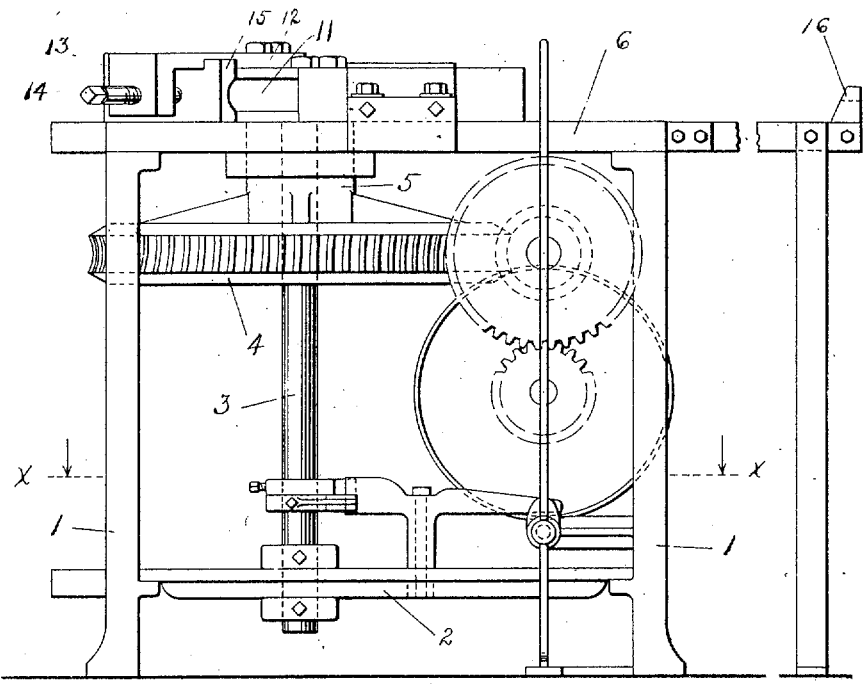
Fig. 4.
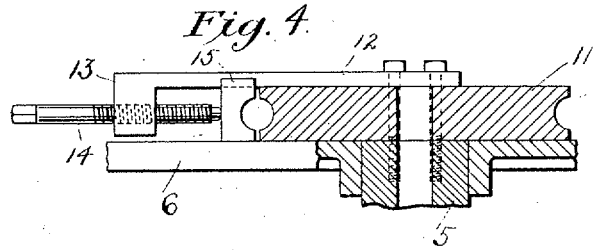
Fig. 6.  Fig. 5.
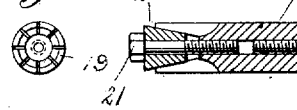
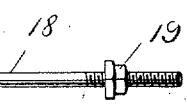
Witnesses:
Inventor
Radu Tattu,
By his Attorney

R. TATTU.
TUBE BENDING MACHINE.
APPLICATION FILED JAN. 17, 1910.

986,654.

Patented Mar. 14, 1911.
2 SHEETS—SHEET 2.

Witnesses:

Inventor
Radu Tattu
By his Attorney

UNITED STATES PATENT OFFICE.

RADU TATTU, OF NEW YORK, N. Y.

TUBE-BENDING MACHINE.

986,654.     Specification of Letters Patent.     Patented Mar. 14, 1911.

Application filed January 17, 1910. Serial No. 538,339.

*To all whom it may concern:*

Be it known that I, RADU TATTU, a citizen of the United States, residing in the borough of Brooklyn, in the city of New York, county of Kings, and State of New York, have invented certain new and useful Improvements in Tube-Bending Machines, of which the following is a specification.

My invention relates to improvements in tube bending machines and the object of my invention is to provide a simple and efficient device for bending tubes. I accomplish this object by the device illustrated in the accompanying drawings, in which—

Figure 2:
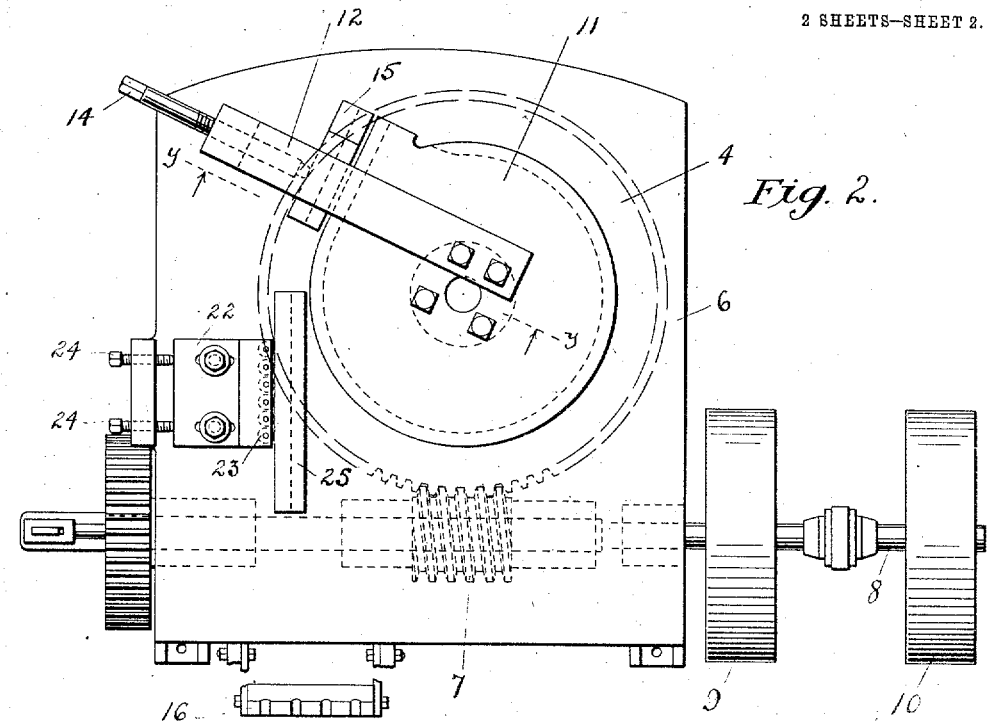
Figure 3:
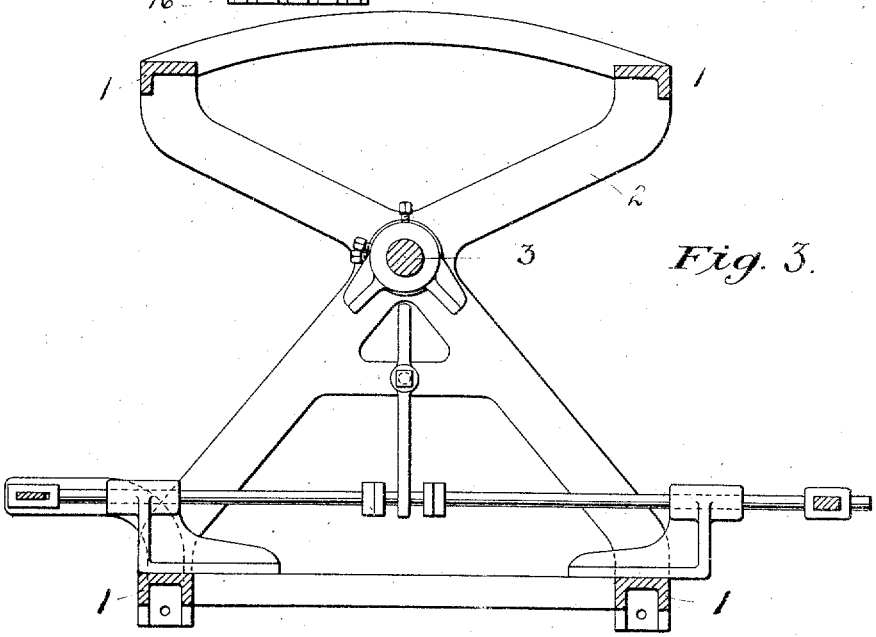

Figure 1 is an elevation of the device, Fig. 2 is a plan view of the same, Fig. 3 is a cross section of the device on the line $x$—$x$ in Fig. 1, Fig. 4 is a view of the bending wheel and clutch on the line $y$—$y$ in Fig. 2, Fig. 5 is a view of the core partly in section, and Fig. 6 is an end view of the same.

Similar characters refer to similar parts throughout the several views.

Upon a frame 1 I provide a support 2 preferably extending from side to side of the frame near the base. Upon this support 2 I journal a vertical axle 3 having a gear 4 thereon near its upper end, the said gear having a hub 5 integral therewith extending upwardly through the table 6. A worm gear 7 engaging the gear 4 is suitably supported by the frame 1. The shaft 8 of the worm gear 7 is provided with two driving pulleys 9 and 10, one of said driving pulleys 9 serving to rotate the shaft 8 in one direction, and the other driving pulley 10 serving to rotate the shaft 8 in the opposite direction, this being accomplished by means of a crossed belt and a clutch in the usual manner.

On the upper side of the table 6 and set upon the upper end of the hub 5, I provide a circular grooved rotating member 11 upon the upper side of which rotating member 11 I bolt a clamping member 12 extending outwardly from the rotating member 11 and provided with a downwardly bent end section 13 having a screw threaded aperture which receives the screw bolt 14 which bears against the plate 15. Upon the table 6 I also provide a core holder 16. Upon the table 6 I bolt a guide member 22 provided on its face with ball bearings 23 and having adjusting screws 24, 24 whereby it may be set to tubes of variable size. I also provide a plate 25 concave on its face to engage the tube to be operated upon and slidable upon the guide member 22.

The parts being thus assembled, the operation of my device is as follows: A core 17 upon the core holder 16 is inserted in the tube to be operated upon, and the said tube is passed between the plate 15, which is preferably grooved on its face to receive the tube, and the rotating member 11, the said tube being clamped against the rotating member 11 by the bolt 14 in the downwardly bent end section 13 of the clamping member 12. Power is then applied by a belt upon the driving pulley 9 to the worm 7 which is caused to rotate, thereby rotating the gear wheel 4 which it engages. The rotating member 11 upon the upper end of the hub 5 upon which the gear 4 is set is thus caused to rotate and the end of the tube to be operated upon is drawn around the rotating member 11, giving the tube the desired bend. The plate 25 moving upon the guide member 22 with the tube serves to prevent the abrasion of the surface of the tube which is being bent. The core 17 within the tube will serve to prevent the collapse of the tube. When the tube has, in the manner indicated, received the desired bend, power is transferred from the pulley 9 to the driving pulley 10 whereby the parts are restored to their normal condition, and, if desired, this may be again repeated and a further bend given to the tube.

While I have shown my device operated by a belt on the driving pulleys 9 and 10, it is obvious that the power may be applied by hand, or in any other desired manner for either or both of said movements.

My improved core 17 comprises a rod 18 screw threaded at its outer end to receive the adjusting nut 19 and upon the other end of said rod I provide a split member conically apertured at its outer end to receive the cone core 20 which is adjustably secured therein by the screw threaded bolt 21. By means of the cone 20 the core may be enlarged or reduced in diameter to meet the requirements of the tube to be operated upon; the cone being drawn into the core or head by means of the bolt 21 to increase the diameter and withdrawn to reduce the diameter in the obvious manner.

Having thus described my invention, what I claim is:

1. In a tube bending machine, a table, a hub therein having its upper face flush with the surface of the table and centrally apertured to receive an axle, an axle therein, a rotating member above the table and set upon the hub, a bar upon the rotating member and having a downwardly bent end section and a plurality of bolts passed through the bar and the rotating member and seated in the hub and axle whereby the axle and hub are bound together substantially as shown and described.

2. A table, a rotatable centrally apertured hub thereon, a gear upon the hub below the table, a vertical axle in the hub, a rotatable bending member above the table and set upon the hub, an arm thereon, having a downwardly bent end section, a clamping screw therein, a plate adapted to rest against a tube to be operated upon to engage the clamping screw, a guide member upon the table, adjusting screws therein and seated in the table and a plate adapted to rest against the pipe to be operated upon substantially as shown and described.

In testimony whereof, I have signed my name to this specification in the presence of two subscribing witnesses, this 29th day of December 1909.

RADU TATTU.

Witnesses:
JUSTIN S. GALLAND,
ADELBERT W. BAILEY.